C. A. PFANSTIEHL.
PROCESS FOR THE PRODUCTION OF DUCTILE TUNGSTEN.
APPLICATION FILED JULY 12, 1915.
1,282,122. Patented Oct. 22, 1918.
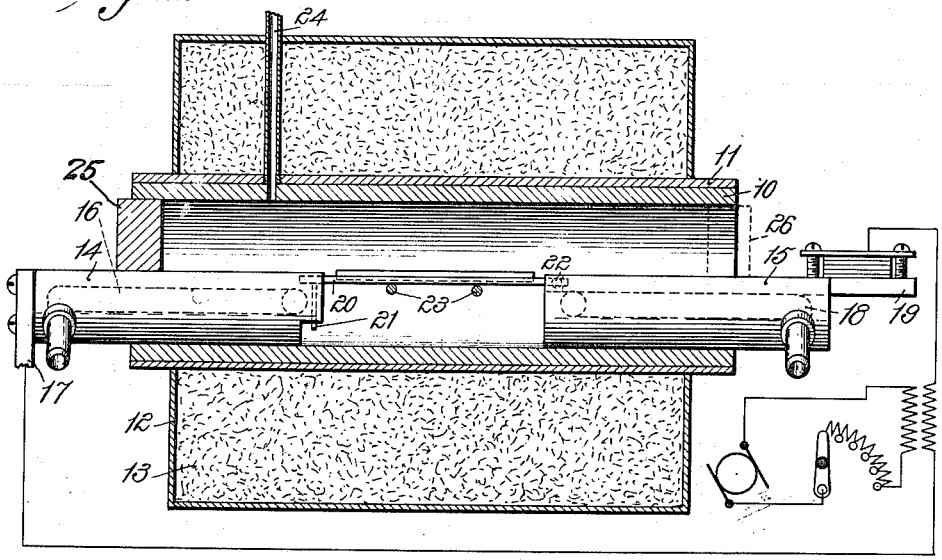
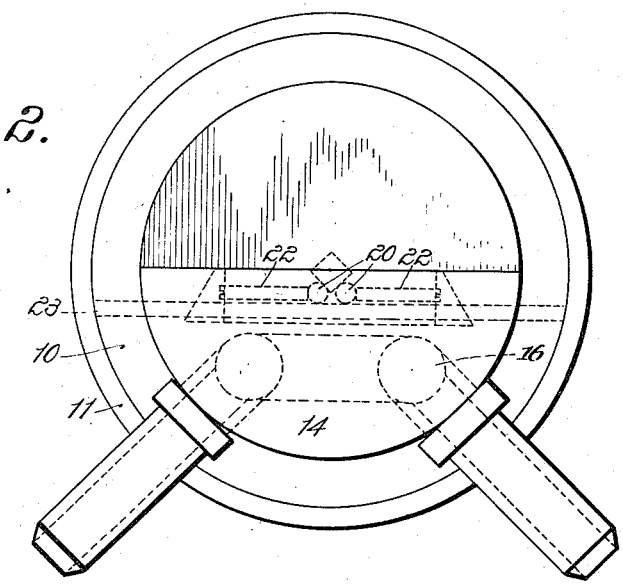
Witnesses:
N. A. Neibinger
Robert F. Brack
Inventor
Carl A. Pfanstiehl
By Williams & Bradbury
Attorney

UNITED STATES PATENT OFFICE.

CARL A. PFANSTIEHL, OF WAUKEGAN, ILLINOIS, ASSIGNOR TO PFANSTIEHL COMPANY, INC., OF NORTH CHICAGO, ILLINOIS, A CORPORATION OF NEW YORK.

PROCESS FOR THE PRODUCTION OF DUCTILE TUNGSTEN.

1,282,122.

Specification of Letters Patent.

Patented Oct. 22, 1918.

Application filed July 12, 1915. Serial No. 39,500.

*To all whom it may concern:*

Be it known that I, CARL A. PFANSTIEHL, a citizen of the United States, residing at Waukegan, in the county of Lake and State of Illinois, have invented certain new and useful Improvements in Processes for the Production of Ductile Tungsten, of which the following is a clear, concise, and exact description, reference being had to the accompanying drawings, forming a part of the specification.

My invention relates to the art of producing ductile or malleable tungsten and constitutes a process whereby I am able to produce ductile or malleable tungsten quickly and economically.

Briefly, in carrying out the process of my invention, I subject the finely divided tungsten under treatment to the action of a press, thereby storing a large quantity of static energy of deformation into and between the particles of the tungsten under treatment, this static energy of deformation being later relied upon in a large measure to weld the tungsten particles together when the ingot produced by the compression of the tungsten particles is subjected to heat treatment in a novel welding furnace hereinafter described.

The welding operation, as will be hereinafter made apparent, is so carried on that the tungsten ingot under treatment is rendered ductile and malleable without any waste of tungsten whatsoever, and is moreover carried on in a single furnace instead of in a plurality of furnaces as under the practice of the prior art.

My invention is fully set forth in the following detailed description in which reference is made to the accompanying drawings in which:

Figure 1 is a view, partly in section and partly in elevation, of the improved welding furnace utilized in carrying out my improved process, and Fig. 2 is a left-end elevation of the sleeve 11 and associated parts, with the heat insulating member 12 omitted.

Similar reference numerals refer to similar parts in both of the figures.

In carrying out the process of my invention, I prefer to start with nonductile tungsten in the form of a powder as fine as can be obtained. I have found that extremely fine and satisfactory tungsten powder may be produced by the following process:

Crude tungsten trioxid $WO_3$ is suspended in hot water and to this is added concentrated ammonium hydroxid. The mixture is then filtered to remove impurities and the filtrate considerably evaporated or boiled down but not quite to dryness, as the result of which monoclinic crystals of ammonium paratungstate $(NH_4)_{10}W_{12}O_{41}, 5H_2O$, settle to the bottom of the evaporating vessel. These crystals are removed from the bottom of the vessel, the soluble impurities being left in the solution. The crystals of ammonium paratungstate are then washed, preferably in distilled water, to cleanse them of the liquid which clings to them when they are removed from the evaporating vessel. The crystals are then dried.

These crystals of ammonium paratungstate may be treated by either of the following processes:

The ammonium paratungstate may be dissolved in a large volume of hot water, after which the solution thus formed may be treated with hydrochloric acid or nitric acid, which is sprayed or atomized into or onto the solution in very fine streams or mist, or is injected into the solution in the form of vapor. When the acid is injected in the form of vapor, it is desirable to boil the acid in a suitable vessel and to conduct the vapor therefrom through a suitable tube terminating in a porous nozzle or distributer, such as, for example, a pipe, tube or plug formed of alundum or other ceramic material not attacked by the acid or the solution in which it is immersed. The acid gas seeping through the pores of the ceramic plug or nozzle reaches the solution of ammonium paratungstate in the most finely divided form. Whether the acid be atomized or applied in the form of vapor, the individual molecules or particles of the acid come separately into contact with and attack the individual molecules or particles of ammonium paratungstate. The resulting reaction precipitates tungsten trioxid in the form of an extremely fine powder.

The second process of treating the ammonium paratungstate to secure tungsten trioxid may be carried out by pouring the cleansed crystals of ammonium paratungstate into an excess of hot, concentrated nitric acid, the solution being stirred during the mixing process. This changes the ammonium paratungstate into yellow tungsten trioxid. The yellow tungsten trioxid after being washed and dried, is heated in a gas muffle furnace, or an electric furnace, to a temperature of 700 or 800 degrees centigrade. This heating imparts to the tungsten trioxid a dull red color which is maintained for five or ten minutes, the heat effectively serving to drive off any acid or volatile substances which may be present.

The tungsten trioxid prepared by either of the above described processes is in the form of an extremely fine powder which may be reduced to fine particles of tungsten metal by placing it in small quantities in nickel, porcelain or alundum boats which are placed within the heating chamber of a reducing furnace.

The tungsten trioxid is heated for about two hours at a temperature of 700 degrees centigrade after which the temperature is increased to approximately 1100 degrees centigrade. During the heating operation pure hydrogen gas is passed through the furnace and brought into contact with the powder to effect the reduction of the tungsten trioxid to very fine particles of metallic tungsten.

The metallic tungsten powder, formed as above described, or having similar characteristics as to fineness, is subjected to a pressure of approximately one hundred and sixty (160) tons per square inch to convert the tungsten powder into the form of an ingot, preferably of polygonal cross-section for a reason to be made apparent in the description of the welding operation to which the ingot is subsequently subjected. In compressing the tungsten powder, it is important that the powder be compressed to a degree beyond the point at which no further compression can occur. I have found that at this point the ingot has a density of substantially 16.02. In the compressing operation the kinetic energy exerted through the press is transformed into static energy of deformation among and between the particles of tungsten, the particles being driven together with such force that they are intermingled or intermixed under a very considerable deformation. Fine tungsten powder will absorb and hold more static energy of deformation than will a coarser powder, and therefore I prefer to utilize comparatively fine tungsten powder in carrying out the process of my invention. I find that the static energy with which the compressed ingot is charged in the press may be relied upon to in a very large measure weld the particles together when the ingot is subsequently treated in the welding furnace.

The sticks of compressed tungsten powder produced by the applicant's process are much stronger than those produced by the pressures heretofore employed. While these sticks can be broken by the pressure that a person is able to apply with his hands nevertheless they are strong enough so that they may be handled without taking any particular precaution without being broken. During the sintering process a bar compressed to a density of 16.2 will shrink about $\frac{1}{32}$ of an inch. A bar compressed to a density of 15.5 will shrink about $\frac{1}{16}$ of an inch. The shrinkage in a bar compressed to a density of 15 is about $\frac{1}{4}$ of an inch, and the shrinkage of a bar compressed to a density of 14 is about $\frac{3}{8}$ of an inch. The above figures indicate that the critical density at which the shrinkage becomes almost negligible is about 15.5.

The welding furnace illustrated in the drawings preferably comprises an alumina or alundum tube 10 constituting the heating chamber, the refractory alumina or alundum tube being provided with an inclosing sleeve 11 preferably of steel. The tube 10 and sleeve 11 extend through a metal box or container 12 which holds a quantity of silex or other heat-insulating material which surrounds the sleeve 11.

Located in each end of the alumina or alundum tube 10 is a brass connector, said brass connectors being illustrated at 14 and 15 respectively. The connector 14 is substantially semi-circular in cross-section and is provided with a substantially U-shaped bore 16 the legs of which are arranged to be connected with a suitable source of cooling water whereby the connector 14 may be kept cool. Water circulating through the bore 16 maintains the connector 14 at so low a temperature that the metallic connecting parts and conductors are not endangered by the high heat developed in the heating chamber of the furnace. Secured to the brass connector 14 by screws or otherwise is a suitable copper connector 17 arranged to be connected with the source of electric energy supply.

The connector 15, like the connector 14, is substantially semi-circular in cross-section, and is provided with a bore or passage 18 through which water may be circulated to keep the connector 15 sufficiently cool. The connector 15, however, differs from the connector 14 in that it is provided with a sliding terminal 19 having dove-tailed sliding connection with the connector 15, as is most clearly illustrated in Fig. 2. Upon the right end of the sliding terminal 19 (Fig. 1) is mounted a connector arranged to be electrically connected with the source of electricity supply.

cally the same degree of ductility as the ingots produced by the prior methods after they have received from one-third to one-half of the mechanical working heretofore necessary.

After a tungsten ingot has been subjected to the welding operation, it can be subjected to any desirable amount of mechanical working, which need not be here explained. As previously pointed out, however, the ingots subjected to my improved process hereinbefore described, do not require as much mechanical working as do ingots subjected to processes of the prior art in order to secure the necessary result.

Having now described my improved process, what I claim as new and desire to secure by Letters Patent of the United States is:

1. The process which consists in compressing tungsten powder to the critical point at which the tungsten can absorb no more mechanical energy, and then heating the tungsten.

2. The process which consists in converting tungsten powder into the form of an ingot by compressing the powder to the critical point at which it can absorb no more mechanical energy, and then heating the ingot.

3. The process which consists in subjecting the tungsten powder to a pressure of substantially one hundred sixty (160) tons per square inch, and then heating the tungsten thus compressed.

4. The process of producing ductile tungsten which consists in compressing the tungsten to a degree above the critical point at which it can absorb no more mechanical energy, and then heating the tungsten thus compressed in a welding furnace.

5. The process which consists in subjecting fine tungsten powder to the action of a hydraulic press to give the powder the form of an ingot and to compress it until it can absorb no more mechanical energy, and subsequently heating said ingot in a welding furnace.

6. The process which consists in subjecting fine tungsten powder to the action of a press to compress the powder until it can absorb no more mechanical energy, and subsequently utilizing the static energy of deformation among and between the tungsten particles to weld them together when the compressed powder is heated in a welding furnace.

7. The process of producing ductile tungsten which consists in compressing tungsten powder to form an ingot, placing said ingot upon a cradle of ductile tungsten rods, and then passing an electric current through said ductile tungsten rods to heat them and the supported ingot to incandescence.

8. The process of producing ductile tungsten which consists in placing a tungsten ingot on a cradle of ductile tungsten, and then passing an electric current through said cradle to heat the same and the supported ingot to incandescence.

9. The process of producing ductile tungsten which consists in placing an ingot of tungsten upon a cradle longer than the ingot, and passing an electric current through the cradle until the ingot has been raised to a sintering temperature.

10. The process of producing ductile tungsten which consists in placing an ingot of compressed tungsten powder upon a cradle, and passing an electric current through the cradle to heat the cradle and weld the ingot.

11. The process which consists in compressing tungsten powder to give it the form of an ingot, placing the ingot thus formed upon a cradle, and passing an electric current through the cradle in an atmosphere of hydrogen to heat the cradle and weld the ingot.

12. The process which consists in compressing tungsten powder to give it the form of an ingot, placing the ingot thus formed upon a cradle of ductile tungsten, and passing an electric current through the cradle in an atmosphere of hydrogen to heat the cradle and weld the ingot.

13. The process which consists in compressing tungsten powder until it can absorb no more mechanical energy, and then heating said compressed powder in an atmosphere of hydrogen.

14. The process which consists in compressing tungsten powder until it can absorb no more mechanical energy, placing the compressed powder upon a cradle, and then passing an electric current through said cradle in an atmosphere of hydrogen to heat the cradle and weld the tungsten powder.

15. The process which consists in compressing tungsten powder to the critical point at which it can absorb no more mechanical energy and to give the powder the form of an ingot, placing the ingot thus formed upon a cradle of ductile tungsten, and passing an electric current through said cradle in an atmosphere of hydrogen to heat the cradle and weld the ingot.

16. The process which consists in compressing tungsten powder to the critical point at which it can absorb no more mechanical energy to give the powder the form of an ingot, placing the ingot thus formed upon a cradle of ductile tungsten, and passing an electric current through the cradle to heat the cradle and weld the ingot.

17. The process of producing ductile tungsten which consists in heating compressed tungsten powder upon a cradle of ductile tungsten in an atmosphere of hydrogen.

18. The process which consists in placing a tungsten ingot upon a cradle of ductile Formed in the inner end of the brass connector 14 is a pair of apertures into which extend the ends of a pair of parallel horizontal tungsten rods 20, which, as will be presently explained, form a cradle for a tungssten ingot to be welded. Suitable set-screws, one of which is indicated at 21, may be provided to retain the ends of the tungsten rods 20 in the connector 14, as illustrated. The right ends of the tungsten rods 20 are fitted in apertures formed in the left end of the sliding terminal 19, and the rods 20 may be secured in the sliding terminal by suitable set-screws 22, as is most clearly illustrated in Fig. 2. The rods 20 are of ductile tungsten and are conveniently circular in cross-section. In order to lend additional support to the ductile tungsten rods 20, I provide a pair of transverse supporting rods 23 of ductile tungsten which bear in the alumina of alundum tube 10. The tungsten rods 23 are, of course, slipped to position before the sleeve 11 is placed around the refractory tube 10.

During the welding operation, it is desirable that hydrogen be admitted to the heating chamber, and therefore I provide a hydrogen inlet pipe, illustrated at 24. The inlet pipe 24 is arranged to be connected by any suitable means with a supply of purified hydrogen. During the heating operation it is, of course, desirable to close the ends of the refractory tube 10, and, therefore, I provide semicircular blocks, one of which is indicated in full lines at 25, and the other of which is indicated in dotted lines at 26. The connector 14 and the sliding terminal 19 are electrically connected with the terminals of the secondary winding of a suitable alternating current transformer, as illustrated, the primary winding of the transformer being electrically connected with a generator, as illustrated. In the primary circuit is preferably included a regulating rheostat in order that any desired current may be supplied to the furnace-heating elements.

After a tungsten ingot has been subjected to compression, as previously explained, it is placed in the novel welding furnace just described. The compressed tungsten ingot, which has preferably been given a square or rectangular cross-section, is laid upon the tungsten rods 20 which form a cradle. A current of electricity is now passed through the tungsten rods 20, heating them to incandescence. Part of the current will be diverted from the tungsten rods and flow through the ingot. The bulk of the current will, however, flow through the rods 20. The rods 20, having been worked, will not tend to sag to the same extent as will the ingot which has not been worked, especially since they are supported at points intermediate of their ends by the transverse tungsten rods 23. The result is that the tungsten ingot under treatment will sag into continued contact with the tungsten rods constituting the cradle. As a result, the tungsten ingot will be heated substantially uniformly from end to end and may be heated almost to the fusing point of metallic tungsten. During the heating operation hydrogen is passed into the furnace chamber to prevent oxidization.

I find that when the tungsten ingot is subjected to treatment in the welding furnace, the static energy of deformation absorbed by the tungsten particles in the press serves to a large extent to weld the particles of the tungsten powder together. It will be seen that my method of welding the tungsten ingot can be carried on with no waste whatsoever.

In the prior art it has been necessary to weld ingots of tungsten powder in two operations, first in a tube furnace in which a fairly high degree of heat is employed, and later in a bell or bottle in which a heavy current is passed through the tungsten ingot. In the processes of the prior art it has been found necessary to suspend the tungsten ingot in the bell and to make electrical connection with the ingot at each end thereof. This elaborate welding furnace has been necessary because of the severe contraction of the tungsten which takes place while it is undergoing the welding operation. It has been necessary for the terminals to accommodate themselves to this contraction. In these welding furnaces of the prior art it has been necessary to weld the tungsten ingot at a moderate temperature in order to give it sufficient strength to be lifted from its flat surface for the final treatment. Even during the final treatment it has been impossible to raise the temperature practically up to the fusing point of metallic tungsten because at this temperature the tungsten ingots do not have sufficient strength to permit of their support in vertical position under varying conditions of stress. Moreover, the terminals embrace a considerable portion of the rod and maintain that portion at so low a temperature that it does not weld. Therefore, a considerable portion of the ingots subjected to the processes of the prior art are waste.

Under my process as carried out in my welding furnace, the tungsten bar or ingot is heated from end to end to a very much higher temperature than has heretofore been attained. The treatment in one welding furnace takes the place of treatment in two furnaces under the prior practice. The entire ingot is workable. There is no waste, and the higher temperature at which the bar is welded aids in producing a ductile ingot. The result is that the ingots subjected to my improved process have practitungsten, and heating the cradle in an atmosphere of hydrogen by passing an electric current through the cradle.

19. The process of producing ductile tungsten which consists in compressing finely powdered tungsten into the form of a rod having a density of substantially 16.02 supporting the rod throughout its length and heating it to the fusing temperature of tungsten.

20. The process of producing ductile tungsten which consists in compressing finely powdered tungsten into an ingot substantially six inches long of a density of substantially 16.02 supporting the ingot throughout its length and then heating it to a temperature at which the ingot would fall apart if vertically supported from its upper end.

21. The process of producing ductile tungsten which consists in injecting into a solution of ammonium paratungstate finely divided streams of an acid gas adapted to react with the ammonium paratungstate to produce tungsten trioxid, reducing the tungsten trioxid thus formed in a hot hydrogen bath, compressing the tungsten powder thus formed to as small a volume as it will retain under relieved pressure, supporting the ingot thus formed throughout its length and heating it to fusion at atmospheric pressure in a welding furnace.

22. The process of producing ductile tungsten which consists in compressing finely powdered tungsten to a density greater than 15.5 and subsequently fusing the ingot thus formed.

In witness whereof, I have hereunto subscribed my name this 21st day of June, A. D. 1915.

CARL A. PFANSTIEHL.

Witnesses:
MARY A. COOK,
ALBIN C. AHLBERG.